United States Patent [19]

Matsuzaki et al.

[11] Patent Number: 5,418,265
[45] Date of Patent: May 23, 1995

[54] POWDER EPOXY RESIN COATING COMPOSITION

[75] Inventors: Kunimitsu Matsuzaki, Yono; Kazuya Ono, Tokyo; Seitaro Iwamoto, Soka; Mikio Osa, Saitama; Takeshi Watanabe, Soka, all of Japan

[73] Assignee: Somar Corporation, Japan

[21] Appl. No.: 170,995

[22] Filed: Dec. 21, 1993

Related U.S. Application Data

[63] Continuation of Ser. No. 823,970, Jan. 22, 1992, abandoned.

[30] Foreign Application Priority Data

Jan. 25, 1991 [JP] Japan ..................... 3-025777

[51] Int. Cl.$^6$ .............................................. C08L 63/00
[52] U.S. Cl. ..................... 523/440; 525/530; 525/533; 525/534; 525/934
[58] Field of Search ............... 523/440, 442, 443; 525/533, 530, 534, 913, 934

[56] References Cited

U.S. PATENT DOCUMENTS

| | | | |
|---|---|---|---|
| 4,617,330 | 10/1986 | Thai et al. | 523/444 |
| 4,638,021 | 1/1987 | Ando et al. | 523/457 |
| 4,652,597 | 3/1987 | Itabashi et al. | 523/444 |
| 4,681,904 | 7/1987 | Yasuda et al. | 523/457 |
| 4,898,620 | 2/1990 | Rayfield et al. | 523/440 |
| 5,008,309 | 4/1991 | Ibe et al. | 523/442 |
| 5,015,671 | 4/1991 | Ono et al. | 523/457 |
| 5,049,596 | 9/1991 | Fujimoto et al. | 523/427 |
| 5,137,940 | 8/1992 | Tomiyoshi et al. | 523/443 |

FOREIGN PATENT DOCUMENTS

| | | |
|---|---|---|
| 57-40524 | 3/1982 | Japan . |
| 58-198525 | 11/1983 | Japan . |
| 60-190418 | 9/1985 | Japan . |
| 63-168472 | 7/1988 | Japan . |
| 63-310504 | 12/1988 | Japan . |
| 64-001771 | 6/1989 | Japan . |
| 3-269066 | 11/1991 | Japan . |

OTHER PUBLICATIONS

T. S. Carswell "Phenoplasts" (which is vol. 7 of High Polymers) pp. 29-34 Intersciences Publishing 1947.

*Primary Examiner*—John C. Bleutge
*Assistant Examiner*—Randy Gulakowski
*Attorney, Agent, or Firm*—Lorusso & Loud

[57] ABSTRACT

A powder coating composition useful for fixation of rotor and stator windings is disclosed, which includes
- 100 parts by weight of an epoxy resin;
- 5-35 parts by weight of an acid anhydride;
- 2-30 parts by weight of a phenol resin;
- 0.05-5 parts by weight of a curing accelerator; and
- 130-270 parts by weight of an inorganic filler consisting of 99.7-87.0% by weight of a first filler component having an average particle size of 0.5-100 μm and 0.3-13.0% by weight of a second filler component having an average particle size of 0.1 μm or less.

4 Claims, No Drawings

POWDER EPOXY RESIN COATING COMPOSITION

This application is a continuation of application Ser. No. 07/823,970, filed Jan. 22, 1992, now abandoned.

BACKGROUND OF THE INVENTION

This invention relates generally to a powder coating composition and, more specifically, to an epoxy resin-containing powder coating composition useful for insulation of rotor or stator coils encapsulation of electric parts and formation of moldings.

Powder coating compositions are now widely used for various applications such as for coil fixation purposes and slot insulation purposes. Insulating resins to be used for fixation of rotor and stator coils are desired to have a high impact resistance, a high hardness and a high resistance to thermal shocks. Known epoxy resin-containing powder coating compositions are, however, not fully satisfactory in these respects.

SUMMARY OF THE INVENTION

It is an object of the present invention to provide a powder coating composition which is stable and withstands a long period of storage, which exhibits good gel time in use, which provides strong bonding to solid surfaces to be bonded and which shows a high impact resistance, a high hardness and a high resistance to thermal shocks.

In accordance with the present invention there is provided a powder coating composition comprising:
100 parts by weight of an epoxy resin;
5-35 parts by weight of an acid anhydride;
2-30 parts by weight of a phenol resin;
0.05-5 parts by weight of a curing accelerator; and
130-270 parts by weight of an inorganic filler consisting of 99.7-87.0% by weight of a first filler component having an average particle size of 0.5-100 $\mu$m and 0.3-13.0% by weight of a second filler component having an average particle size of 0.1 $\mu$m or less.

The present invention will now be described in detail below.

DESCRIPTION OF THE PREFERRED EMBODIMENTS

As the epoxy resin to be used in the present invention, there may be mentioned a diglycidyl ether of bisphenol A, a diglycidyl ester of bisphenol F, a cresol novolak epoxy resin, a phenol novolak epoxy resin, an alkylphenol novolak epoxy resin, an alicyclic epoxy resin, a hydrogenated diglycidyl ether of bisphenol A, a hydrogenated diglycidyl ether of bisphenol AD, a diglycidyl ether of a polyol such as propylene glycol or pentaerythrytol, an epoxy resin obtained by reaction of an aliphatic or aromatic carboxylic acid with epichlorohydrin, an epoxy resin obtained by reaction of an aliphatic or aromatic amine with epichlorohydrin, a heterocyclic epoxy resin, a spiro-ring containing epoxy resin and a resin modified with an epoxy group. These epoxy resins may be used singly or as a mixture of two or more thereof.

It is preferable to use a mixture of 95-70% by weight of a diglycidyl ether of bisphenol A and 5-30% by weight of a novolak type epoxy resin since the resulting powder composition shows a high heat resistance and a high toughness when cured.

The epoxy resin to be used in the present invention is generally a solid at 25° C. A liquid epoxy resin, however, may be used in combination with a solid epoxy resin as long as the resulting powder composition does not cause blocking.

In the present invention, an acid anhydride is used in conjunction with a phenol resin as a curing agent for the epoxy resin. Examples of the acid anhydrides include phthalic anhydride, trimellitic acid anhydride, pyromellitic acid anhydride, 3,3',4,4'-benzophenonetetracarboxylic anhydride, ethylene glycol bisanhydrotrimellitate, glycerol trisanhydrotrimellitate, 5-(2,5-dioxotetrahydrofuryl)-3-methyl-3-cyclohexene-1,2-dicarboxylic anhydride, tetrahydrophthalic anhydride and 4,4'-oxydiphthalic anhydride. The use of an aromatic acid anhydride is preferred.

The phenol resin, which is another component of the curing agent, is obtained by reaction of a phenol compound with formaldehyde and contains at least two hydroxyl groups. Illustrative of suitable phenol resins are phenol novolak resins, cresol novolak resins, t-butylphenol novolak resins, actylphenol novolak resins, nonylphenol novolak resins and bisphenol novolak resins. These phenol resins may be used singly or as a mixture of two or more thereof. A phenol resin obtained by reaction of two or more different phenol compounds with formaldehyde may also be used for the purpose of the present invention.

The acid anhydride and phenol resin are used in amounts of $0.85 \times p \times A$ equivalent and $0.9 \times (1-p) \times B$ equivalent, respectively, per equivalent of the epoxy groups of the epoxy resin, wherein p is a number of 0.2-0.95, A is a theoretical amount of the acid anhydride required for curing by itself the epoxy resin, and B is a theoretical amount of the phenol resin required for curing by itself the epoxy resin. Generally, the acid anhydride and phenol resin are used in amounts of 5-35 parts by weight and 2-30 parts by weight, respectively, per 100 parts by weight of the epoxy resin.

As the curing accelerator to be used in the present invention, there may be mentioned tertiary amines such as triethylamine, N,N-dimethylbenzylamine, 2,4,6-tris(-dimethylaminomethyl)phenol and N,N-dimethylaniline; imidzole compounds such as 2-methylimidazole and 2-phenylimidazole; triazine salts, cyanoethyl salts and cyanoethyltrimellitic acid salts of imidazole compounds; metal salts such as zinc acetate and sodium acetate; quarternary ammonium salts such as tetraammonium bromide; amides; peroxides; azo compounds; cyanates; isocyanates; and triphenylphosphine.

The curing accelerator is used in an amount of 0.05-5 parts by weight, preferably 0.1-3 parts by weight per 100 parts by weight of the epoxy resin. An amount of the curing accelerator below 0.05 parts is disadvantageous because a high temperature and/or a long period of time are required for curing. When the amount of the accelerator exceeds 5 parts, the resulting powder composition becomes poor in stability during storage.

The inorganic filler to be used in the present invention consists of 99.7-87.0% by weight, preferably 99.5% by weight, of a first filler component having an average particle size of 0.5-100 $\mu$m and 0.3-13.0% by weight, preferably 0.5-10% by weight of a second filler component having an average particle size of 0.1 $\mu$m or less. As the first and second filler components, there may be used calcium carbonate, magnesium carbonate, silica, alumina, talc, clay, mica and surface treated products of them. The inorganic filler is used in an amount of 130–270 parts by weight, preferably 150–250 parts by weight per 100 parts by weight of the epoxy resin.

The powder coating composition of the present invention may additionally contain one or more additives such as a flame retardant such as hexabromobenzene, antimony trioxide or tetrabromobisphenol A; a pigment such as carbon black, titanium oxide, red iron oxide or chromium oxide; a coupling agent such as of a zirocoaluminum type, a silane type or a titanium type; a leveling agent such as an acrylic acid ester oligomer; a resin such as a butyral resin or a polyester; and a rubber such as carboxy-terminated butadiene acrylonitrile copolymer rubbers and nitrile-butadiene rubbers.

The powder coating composition may be prepared in any known manner. For example, respective ingredients are mixed with each other and the mixture is fused, commingled and extruded with an extruder. The exrudates are then solidified and pulverized to obtain a powder coating composition.

The following examples will further illustrate the present invention.

EXAMPLE

Epoxy resin powder compositions having the formulations shown in Table 1 were prepared. Each of the compositions was then tested for evaluating performances thereof in the manner described hereinafter. The results are summarized in Table 2. In Table 1, the amounts are part by weight and the trademarks and abbreviations are as follows:

Epoxy Resin
EPIKOTE 1002: Diglycidyl ether of bisphenol A; manufactured by Yuka-Shell Epoxy Inc.; epoxy equivalent: 650
EPIKOTE 1004: Diglycidyl ether of bisphenol A; manufactured by Yuka-Shell Epoxy Inc.; epoxy equivalent: 925
E180S75: o-Cresol novolak epoxy resin; manufactured by Yuka-Shell Epoxy Inc.; epoxy equivalent: 211

Curing Agent
Anhydride-1: 3,3′,4,4′-benzophenonetetracarboxylic anhydride
Anhydride-2: Ethylene glycol bisanhydrotrimellitate
Phenol resin-1: Phenol novolak resin; softening point: 110° C.; TAMANOL 754 (manufactured by Arakawa Kagaku Kogyo K. K.)
Phenol resin-2: o-Cresol novolak resin; softening point:
130° C.; OCN-130 (manufactured by Nippon Kayaku K. K.)

Curing Accelerator
MI: 2-Methylimidazole
TPP: Triphenylphosphine

Filler
6.5 Ca: Calcium carbonate; average particle size: 6.5 $\mu$m; KC-30 (manufactured by Bihoku Funka Kogyo K. K.)
3.6 Ca: Calcium carbonate; average particle size: 3.6 $\mu$m; LITON A-5 (manufactured by Bihoku Funka Kogyo K. K.)
0.07 Ca: Calcium carbonate; average particle size: 0.07 $\mu$m
0.07 LCa: Light calcium carbonate; average particle size:
0.07 $\mu$m; HOMOCAL D (manufactured by Shiroishi Kogyo K.K.)

Leveling Agent
Acryl oligomer: Acrylic ester oligomer; NIKALITE XK-21 (manufactured by Nihon Carbide Kogyo K. K.)

The test methods are as follows:
(1) Gel Time
In accordance with JIS C2104, sample powder composition is placed in a circular depressed portion of a hot metal plate maintained at 200° C. The period of time required for the sample to gel is measured.

(2) Impact Resistance
An iron plate preheated to 160° C. is applied with a sample powder composition by the fluidized bed immersion method and is hardened at 180° C. for 30 minutes to form a coating having a thickness of 0.5 mm. Using du-Pont type impact testing machine, a weight of 0.5 kg is dropped on the coated plate from a height of 500 mm. Whether or not the coating is cracked or broken is observed. The impact resistance is evaluated according to the following ratings:
A: No crack or breakage is observed.
B: Crack or breakage is observed.

(3) Hardness
An iron square bar (12.5×12.5×100 mm) preheated to 160° C is applied with a sample powder composition by the fluidized bed immersion method and is hardened at 180° C. for 30 minutes to form a coating having a thickness of 0.5 mm. A copper wire with a diameter of 1 mm is wound around the coated iron bar while applying a tension of 10 kg. The resulting bar is then allowed to stand at 200° C. for 20 hours. Thereafter, the winding is removed to measure the depth through which the copper wire has been cut into the coating. The hardness of the coating is evaluated according to the following ratings:
A: cutting depth is less than 100 $\mu$m
B: cutting depth is 100 $\mu$m or more, (3) Resistance to Thermal Shock
A motor armature (slot diameter: 55 mm, stacking thickness: 40 mm, slot width: 3 mm, number of slots: 14, shaft diameter: 8 mm) preheated to 160° C. is applied with a sample coating composition by the fluidized bed immersion method and is hardened at 180° C. for 30 minutes. The resulting armature is placed for 1 hour in a cooler maintained at −40° C. and, then, for 1 hour in a heater maintained at 125° C. Such cooling and heating steps are cyclically repeated 50 times. The armature is then checked to determine whether or not crack or breakage is caused. The resistance to thermal shock is evaluated according to the following ratings:
A: No crack or breakage is observed.
B: Crack or breakage is observed.

TABLE 1

| Sample No. | 1 | 2 | 3 | 4 | 5 | 6 | 7 | 8* | 9* | 10* | 11 |
|---|---|---|---|---|---|---|---|---|---|---|---|
| Epoxy resin | | | | | | | | | | | |
| EPIKOTE 1002 | 100 | 100 | 100 | 100 | 80 | — | — | 100 | 100 | 100 | 100 |
| EPIKOTE 1004 | — | — | — | — | — | 100 | 90 | — | — | — | — |
| E180S75 | — | — | — | — | 20 | — | 10 | — | — | — | — |

TABLE 1-continued

| Sample No. | 1 | 2 | 3 | 4 | 5 | 6 | 7 | 8* | 9* | 10* | 11 |
|---|---|---|---|---|---|---|---|---|---|---|---|
| Curing agent | | | | | | | | | | | |
| Anhydride-1 | 18.8 | 10.4 | 6.3 | 10.4 | 14.9 | 7.3 | 9.8 | 10.4 | 21.0 | — | — |
| Anhydride-2 | — | — | — | — | — | — | — | — | — | — | 13.4 |
| Phenol resin-1 | — | — | — | 7.3 | 10.3 | — | — | — | — | — | 7.3 |
| Phenol resin-2 | 1.7 | 8.1 | 11.7 | — | — | 5.7 | 9.8 | 8.1 | — | 16.7 | — |
| Curing accelerator | | | | | | | | | | | |
| MI | 0.2 | 0.2 | 0.2 | — | 0.2 | 0.2 | — | 0.2 | 0.2 | 0.2 | 0.2 |
| TPP | — | — | — | 0.3 | — | — | 0.3 | — | — | — | — |
| Filler | | | | | | | | | | | |
| 6.5 Ca | 200 | 2.00 | 200 | 200 | 150 | — | — | 200 | 200 | 200 | 200 |
| 3.6 Ca | — | — | — | — | — | 200 | 200 | — | — | — | — |
| 0.07 Ca | 2 | 2 | 2 | 2 | 10 | — | — | — | 2 | 2 | 2 |
| 0.07 LCa | — | — | — | — | — | 2 | 6 | — | — | — | — |
| Leveling agent Acryl. oligomer | 0.1 | 0.1 | 0.1 | 0.1 | 0.1 | 0.1 | 0.1 | 0.1 | 0.1 | 0.1 | 0.1 |

*Comparative Sample

TABLE 2

| Sample No. | Gel Time (sec) | Impact Resistance | Hardness | Resistance to Thermal Shock |
|---|---|---|---|---|
| 1 | 12 | A | A | A |
| 2 | 13 | A | A | A |
| 3 | 13 | A | A | A |
| 4 | 12 | A | A | A |
| 5 | 10 | A | A | A |
| 6 | 12 | A | A | A |
| 7 | 10 | A | A | A |
| 8* | 10 | B | A | B |
| 9* | 11 | A | A | B |
| 10* | 14 | B | B | A |
| 11 | 16 | A | A | A |

*Comparative Sample

What is claimed is:

1. A powder coating composition comprising:
   100 parts by weight of an epoxy resin;
   5–35 parts by weight of an acid anhydride;
   2–30 parts by weight of a phenol resin selected from the group consisting of phenol novolak resins, cresol novolak resins, t-butylphenol novolak resins, actylphenol novolak resins, nonylphenol novolak resins and bisphenol novolak resins;
   0.05–5 parts by weight of a curing accelerator; and
   130–270 parts by weight of an inorganic filler consisting of 99.7–87.0% by weight of a first calcium carbonate filler component having an average particle size of 0.5–100 μm and 0.3–13.0% by weight of a second calcium carbonate filler component having an average particle size of 0.1 μm or less.

2. A powder coating composition as claimed in claim 1, wherein said inorganic filler consists of 99.5–90% by weight of said first filler component and 0.5–10.0% by weight of said second filler component.

3. A powder coating composition in accordance with claim 1, wherein said second filler component has an average particle size of 0.09 μm or less.

4. A powder coating composition in accordance with claim 1, wherein said second filler component has an average particle size of 0.07 μm or less.

* * * * *